United States Patent [19]

Copley

[11] Patent Number: 5,404,698
[45] Date of Patent: Apr. 11, 1995

[54] COTTON PICKER SPINDLE

[75] Inventor: Russell D. Copley, Ankeny, Iowa

[73] Assignee: Deere & Company, Moline, Ill.

[21] Appl. No.: 99,789

[22] Filed: Jul. 30, 1993

[51] Int. Cl.6 .............................................. A01D 46/16
[52] U.S. Cl. ............................................. 56/41; 56/50
[58] Field of Search ....................................... 56/50, 41

[56] References Cited

U.S. PATENT DOCUMENTS

| | | |
|---|---|---|
| Re. 24,612 | 3/1959 | Lindsay ................................. 56/50 |
| D. 223,679 | 5/1972 | Hayward . |
| 2,787,109 | 4/1957 | Lindsay . |
| 2,823,509 | 2/1958 | Lindsay . |
| 2,953,889 | 9/1960 | Lindsay . |
| 3,220,169 | 11/1965 | Keith . |
| 3,525,202 | 8/1970 | Madden . |
| 3,540,196 | 11/1970 | Mabry et al. ............................ 56/50 |
| 4,483,132 | 11/1984 | Head, Jr. . |

Primary Examiner—Ramon S. Britts
Assistant Examiner—James A. Lisehora

[57] ABSTRACT

A picker spindle is provided having a barb angle of about 50 degrees or less with respect to the spindle axis. A shallow land angle, substantially reduced compared with prior art spindles, and a short gullet area between barbs prevent tight winding of the cotton between barbs. A gentle slope is defined for sliding the cotton easily in the axial direction off the end of the spindle. Less force is needed to unwind the cotton and remove it from the spindle and, as a result, the cotton doffs easier and doffer life is increased. The interval between doffer adjustments is also lengthened.

10 Claims, 1 Drawing Sheet

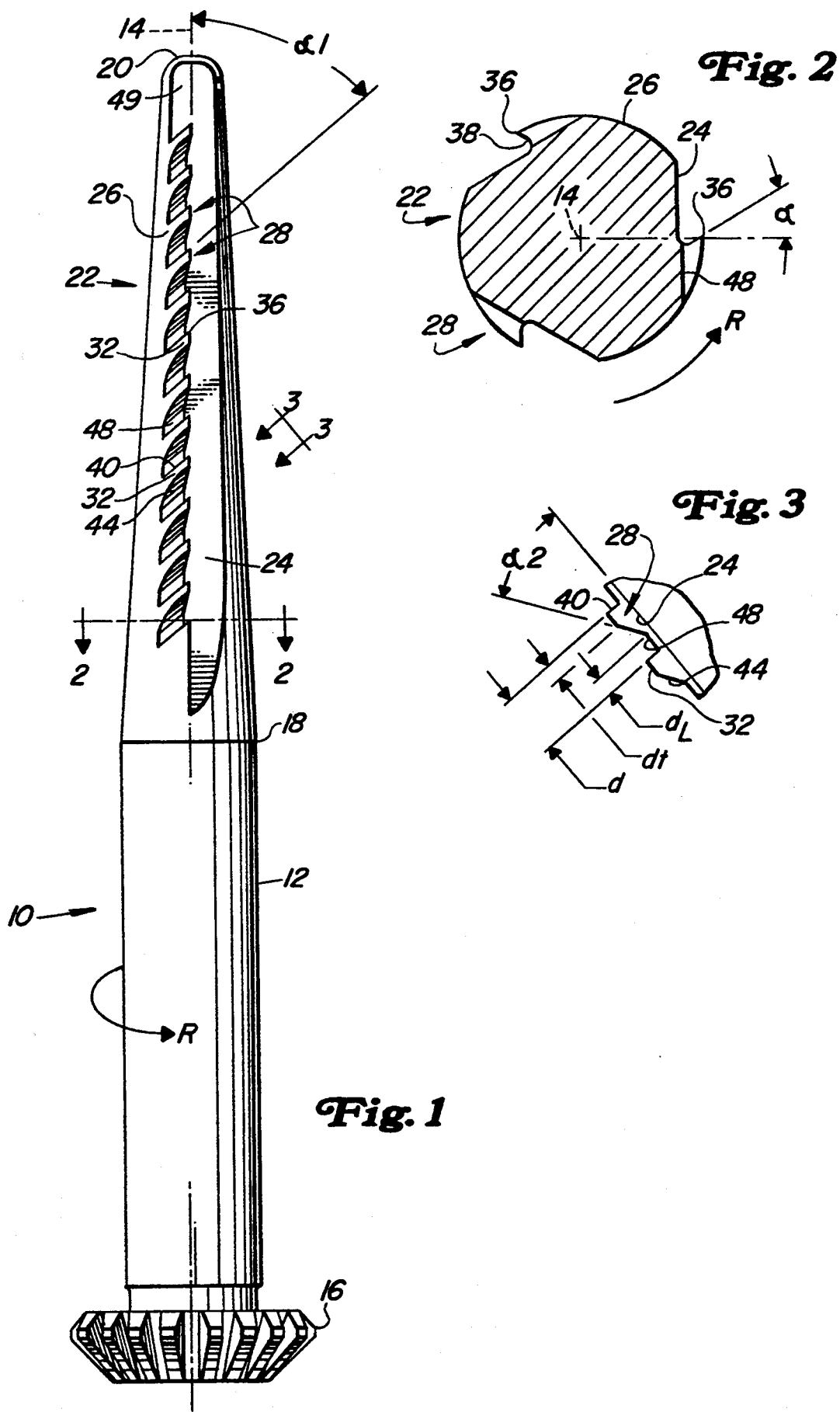

COTTON PICKER SPINDLE

BACKGROUND OF THE INVENTION

1) Field of the Invention

The present invention relates generally to cotton pickers, and, more specifically, to an improved cotton picking spindle.

2) Related Art

Cotton harvesters such as the John Deere Model 9960 and 9965 Cotton Pickers include a plurality of row units, each unit having an upright picker drum with a plurality of spindle bars rotatably mounting tapered spindles with barbs for picking cotton from the plants. The cotton-wrapped spindles pass under rotating doffer disks which unwind the cotton and push the cotton off the ends of the spindles.

The tapered spindles used on most modern cotton pickers consist of rows of barbs machined with barb front angles of from 55 to 65 degrees with respect to the axis of the spindle. Back land angles on the barbs are machined at an angle of about 41 degrees or more with respect to the recessed, flat area between the barbs. An example of a spindle with barb front angles of about 65 degrees and back land angles of substantially greater than 40 degrees is shown in U.S. Pat. No. 4,483,132 of common ownership with the present invention. U.S. Pat. No. 2,823,509 issued to M. E. Lindsay shows another barb configuration wherein the barb front angle is at least about 65 degrees and the back land is formed at an angle of 45 degrees to the recessed area between barbs.

Conventional spindle configurations often require considerable doffing force to unwind the cotton tightly wrapped about the spindle between the barbs and to move the cotton axially off the spindle. As a result, doffer life is adversely affected and time-consuming doffer adjustments must be made frequently.

BRIEF SUMMARY OF THE INVENTION

It is therefore an object of the present invention to provide an improved spindle for a cotton picker. It is a further object to provide such a spindle that overcomes the aforementioned problem.

It is a further object to provide an improved picker spindle which reduces doffer wear and increases the intervals between doffer adjustments. It is another object to provide such a spindle which is easier to doff than at least most previously available spindles.

It is a further object of the invention to provide an improved spindle wherein cotton can be slid more easily outwardly off the spindle to facilitate doffing. It is another object to provide an improved spindle wherein cotton is prevented from winding as tightly between barbs.

In accordance with the teachings of the present invention, a picker spindle is provided having a barb angle of about 50 degrees or less with respect to the spindle axis. A shallow land angle, substantially reduced compared with prior art spindles, prevents tight winding of the cotton between barbs. A gentle slope is defined for sliding the cotton easily in the axial direction off the end of the spindle. Less force is needed to unwind the cotton and remove it from the spindle so that doffer life is increased and the interval between doffer adjustments is lengthened.

These and other objects, features and advantages of the present invention will become apparent to one skilled in the art upon reading the following detailed description in view of the drawings.

BRIEF DESCRIPTION OF THE DRAWINGS

FIG. 1 is a view of a picker spindle with the improved barb construction of the present invention.

FIG. 2 is an enlarged sectional view taken essentially along lines 2—2 of FIG. 1.

FIG. 3 is a view taken along lines 3—3 of FIG. 1 and showing details of the barb construction.

DETAILED DESCRIPTION OF THE DRAWINGS

Referring now to FIG. 1, therein is shown a spindle 10 which includes a cylindrically shaped bearing portion 12 concentric with longitudinal axis 14 and supported in a bushing in the spindle bar (not shown). A gear 16 located at the end of the bearing portion 12 engages a complimentary gear in the spindle bar to rotate the spindle in the direction R (FIG. 2) about the axis 14.

At a location 18, the spindle 10 tapers towards a rounded tip portion 20 to define a cone-shaped picking end 22. The spindle includes three sets of alternating flutes 24 and rounded lands 26 equally spaced about the periphery of the end 22. The flutes 24 lie radially inwardly of the rounded lands 26. A plurality of teeth or barbs 28 project over the flutes 24. The barbs include upper surfaces or tops 32 which lie along the surface of the cone described by the continuation of the lands 26. With the exception of the barb area, discussed in further detail below, the construction and operation of the spindle 10 is generally the same as the spindles on the John Deere 9960 and 9965 Cotton Pickers.

The barbs 28 include pointed tip portions 36 which lie substantially along the surface of the cone described by the continuation of the lands 26. The barbs 28 project in the direction of rotation R over the corresponding flutes 24 (FIG. 2) and are undercut at locations 38 to form an angle $\alpha$ with a radially extending line for aggressive engagement of cotton as the spindle 10 is rotated in the plant. Preferably, the angle $\alpha$ is approximately 30 degrees.

As best seen in FIG. 1, the barbs 28 include an outer or leading wall 40 which is substantially planar. The wall 40 is normal to the flute 24 and is angled forwardly in the direction of rotation R to form a barb angle $\alpha 1$ (FIG. 1) with respect to the longitudinal axis 14 of the spindle. The top 32 of each barb 28 extends axially inwardly (that is, in the direction of the gear 16) from the leading wall 40 to a back wall 44. The back wall 44 slopes radially and axially inwardly with a land back slope angle $\alpha 2$ relative to the flute 24 and terminates at a juncture with a planar gullet area 48 which extends from the back wall 44 to the leading wall 40 of the next barb. The gullet areas 48 lie substantially in a plane parallel to but offset radially outwardly a small distance from the flute 24. An area 49 axially outward of the outermost barb 28 extends in the plane of the gullet areas 48 to the tip portion 20.

As shown in the drawings, twelve barbs 28 are spaced equidistantly along the length of each flute 24. By way of example, the twelve barbs are spaced in an area which is about 1.78 inches in length. The diameter of the bearing portion is approximately 0.49 inches, and the cone-shaped end 22 is tapered at about 1.38 inches per foot from the location 18. The barb spacing d as indicated in FIG. 3 is approximately 0.114 inch, and the tip width $d_t$ is on the order of 0.03 inch. The length of the gullet area $d_L$ is about 0.03 inches or less.

The barb angle $\alpha 1$ is substantially less than 55 degrees, preferably 50 degrees or less so that the barbs 22 are angled towards the tip 20. By pointing the barbs 28 more in the axial direction, cotton can be pushed more easily by the doffer axially along the end 22. The back land angle $\alpha 2$ is substantially less than 41 degrees, preferably 35 degrees or less so that the cotton cannot wrap as tightly between the barbs 28. The relatively gently slope also helps the cotton to slide axially off the spindle under the action of the doffer. By maintaining a relatively short gullet area, less cotton is wrapped in minimum radius areas to further aid doffing.

Having described the preferred embodiment, it will become apparent that various modifications can be made without departing from the scope of the invention as defined in the accompanying claims.

I claim:

1. In a cotton picker spindle having a body rotatable about an axis in a preselected direction of rotation, a tapered end having a tip and a plurality of barbs, a flat gullet area extending between adjacent barbs, the barbs projecting in the preselected direction of rotation and having an axially outermost face angled toward the tip and an axially innermost sloping wall angling radially inwardly toward the flat gullet area, wherein the outermost face forms a barb angle of substantially less than 55 degrees with the spindle axis so that the barbs have a substantial component pointing in the direction of the tip to thereby facilitate doffing of cotton axially from the spindle, and wherein the barbs are spaced a preselected distance apart from each other and the flat gullet area has a length substantially less than half of the preselected distance to prevent wrapping of cotton between the barbs.

2. The invention as set forth in claim 1 wherein the barb angle is approximately 50 degrees.

3. The invention as set forth in claim 1 wherein the innermost sloping wall forms an angle of substantially less than 41 degrees with the flat gullet area to thereby provide a gentle slope for preventing cotton from wrapping tightly between the barbs and for further facilitating doffing of the cotton axially from the spindle.

4. The invention as set forth in claim 3 wherein the flat gullet area has an axial length less than about 0.03 inches.

5. The invention as set forth in claim 3 wherein the sloping wall angle is approximately 35 degrees.

6. The invention as set forth in claim 3 wherein the barbs have a radially outermost portion lying generally on the surface of a cone defined by the tapered end, the radially outermost portions having a width on the order of 0.03 inch.

7. In a cotton picker spindle having a body rotatable about an axis in a preselected direction of rotation, a tapered end having a tip and a plurality of barbs projecting in the direction of rotation, the barbs spaced from each other a preselected distance, a flat gullet area extending between adjacent barbs, the barbs having an axially outermost face angled toward the tip and an axially innermost sloping wall angling radially inwardly toward the flat gullet area, wherein the innermost sloping wall forms an angle of substantially less than 41 degrees with the flat gullet area to thereby provide a more gentle slope and wherein the gullet area has a length substantially less than half of the preselected distance for preventing cotton from wrapping tightly between the barbs and for facilitating doffing of the cotton axially from the spindle.

8. The invention as set forth in claim 7 wherein the sloping wall angle is approximately 35 degrees or less.

9. The invention as set forth in claim 7 wherein the flat gullet area has an axial length less than about 0.03 inches.

10. The invention as set forth in claim 7 wherein the barbs are uniformly spaced along the spindle and have a radially outermost portion lying generally on the surface of a cone defined by the tapered end, the radially outermost portions having a width approximately equal to the length of the gullet area.

* * * * *

UNITED STATES PATENT AND TRADEMARK OFFICE
CERTIFICATE OF CORRECTION

PATENT NO.  : 5,404,698
DATED       : April 11, 1995
INVENTOR(S) : Russell D. Copley It is certified that error appears in the above-indentified patent and that said Letters Patent is hereby corrected as shown below:

```
Claim 7, Column 4, Line 30, after "spindle" insert --,and
wherein the outermost face forms a barb angle of less than
approximately 50 degrees with the spindle axis so that the
barbs have a substantial component pointing in the direction
of the tip to thereby facilitate doffing of cotton axially
from the spindle.--
```

Signed and Sealed this

Twenty-seventh Day of June, 1995

Attest:

BRUCE LEHMAN

*Attesting Officer*     *Commissioner of Patents and Trademarks*